March 17, 1970     G. W. BUSH     3,500,973
FINGER-CUSHIONING PLASTIC LUGGAGE HANDLE
Filed March 13, 1968
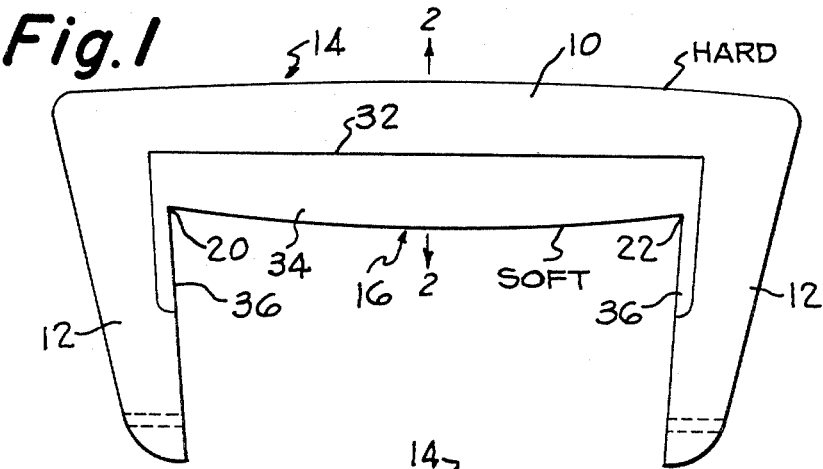
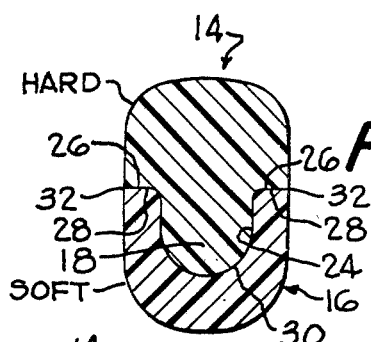
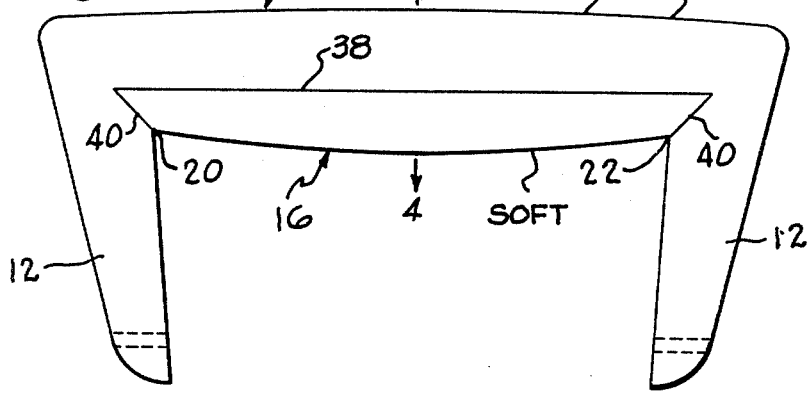
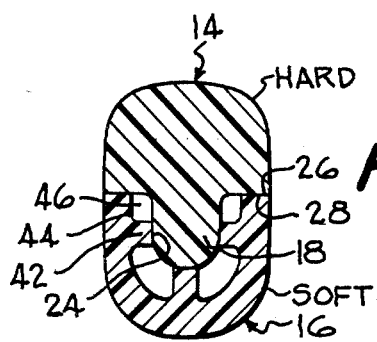
INVENTOR
GEORGE W. BUSH
BY Max R. Millman
ATTORNEY United States Patent Office 3,500,973
Patented Mar. 17, 1970

3,500,973
FINGER-CUSHIONING PLASTIC LUGGAGE HANDLE
George W. Bush, Haddonfield, N.J., assignor to Philadelphia Handle Company, Inc., Camden, N.J., a corporation of New Jersey
Filed Mar. 13, 1968, Ser. No. 712,811
Int. Cl. A45c 13/26
U.S. Cl. 190—57     7 Claims

ABSTRACT OF THE DISCLOSURE

A handle for luggage, carrying cases and the like made entirely of plastic having an upper relatively rigid portion to engage the palm of the hand and a lower finger-cushioning portion which is softer than and fixedly secured to the upper portion by heat sealing or adhesion.

---

This invention relates to a handle for luggage, carrying cases and the like combining a relatively rigid palm engaging outer portion with a softer finger-cushioning inner portion.

There is presently on the market a finger-cushioning handle comprised of an upper or outer rigid substantially channel-shaped metal member sheathed with leather or imitation leather and a lower or inner cushioning member consisting of a core of rubber clad in leather or imitation leather and removably held in the upper member by press fitting its ends therein. This handle is lacking in desirable feel since the upper rigid clad-metal portion is too hard, the lower cushioning portion has too much give and the line of separation of these portions is sharp and thus feels uncomfortable to the grasp. Furthermore, the handle is unattractive because the rigid clad-metal portion is of channel shape and the clad-rubber portion is oddly shaped to fit at its ends removably into the channel of the rigid portion, and in final assembly the sharp line of separation between the two portions adds to its unattractiveness.

The primary object of this invention is to provide a finger-cushioning handle which overcomes the disadvantages residing in the commercial handle noted above.

Another object of the invention is to provide a handle made entirely of plastic and combining a relatively rigid palm-engaging portion with a softer finger-engaging portion which are fixedly secured to each other and in such a manner as to render the handle both functional and attractive.

A further object of the invention is to provide a handle of the character described in which the resiliency of the finger-cushioning portion can be altered without sacrificing the function and appearance of the handle.

Another object of the invention is to provide a handle of the character described in which the fingers are cushioned not only in a direction upwardly towards the palm when the handle is gripped but also in the direction of the sides of the handle.

These and other objects of the invention will become more apparent as the following description proceeds in conjunction with the accompanying drawings, wherein:

FIG. 1 is a side elevational view of one form of the instant handle;

FIG. 2 is a sectional view taken on the line 2—2 of FIG. 1;

FIG. 3 is a side elevational view of a second form of the invention; and

FIG. 4 is a sectional view taken on the line 4—4 of FIG. 3.

Specific reference is now made to the drawings in which similar reference characters are used for corresponding elements throughout.

It should be understood that the handle shown in the drawing is merely illustrative and is capable of being made in different sizes, shapes and textures. It consists essentially of an elongated handgrip portion 10 and arms 12 depending from its ends and adapted to be hingedly or fixedly secured upon luggage or carrying cases by appropriate hardware. The handle is comprised essentially of two members, a first member 14 which includes the grip 10 and depending arms 12, and a second member 16 which constitutes the underside of the grip 10.

The first member 14 is molded of a suitably colored and textured relatively rigid plastic, such for example as polyvinyl chloride, polystyrene, etc. A rigid plastic found suitable for the purpose is polyvinyl chloride modified with polypropylene and sold by Airco Chemical Company of Belleville, N.J. as compound #2003. The second member 16 is also molded of a suitably colored and textured plastic which is resiliently compressible and softer than the first member 14. It can be made, for example, of polyvinyl chloride, polystyrene and the like, sufficiently modified in composition to provide the properties of resilient compressibility and lesser hardness than the plastic used to make the first member 14. A relatively soft plastic found suitable for this purpose is a standard 50 durometer vinyl sold as compound #5004 by A. Shulman & Company of Akron, Ohio. The plastics from which the members 14 and 16 are made can be the same or different in general chemical composition depending upon the overall appearance and texture of the handle desired, except that when different plastics are employed they must be capable of being joined together fixedly.

Coming now to FIGS. 1 and 2, the first member 14 is so formed or molded as to have at its underface a rib 18 protruding therefrom which extends the full length of the grip portion 10, around the inner corners 20 and 22 and for a predetermined distance, generally half-way, along the arms 12. Thus the underface of the member 14 has a non-planar contour consisting of the outline 24 of the protruding rib and the relatively flat ledges or faces 26 laterally on both sides of the rib.

The second member 16 is molded or formed with an exterior contour to conform with the underside of the grip portion 10 and the inside surfaces of the arms 12 so that the final product will have the desired overall appearance and texture and resemble a unitary member. In cross section, the inner face of the second member 16 has longitudinal relatively flat ledges or faces 28 conforming to the ledges 26 of the first member 14, the ledges 28 being spaced laterally from a recess whose surface 30 conforms to that of the protruding rib 18.

When the members 14 and 16 are interfitted, they are fixedly secured or bonded to each other by a suitable adhesive or by heat sealing. The final handle has a unitary appearance and feel since the outer surfaces of the members 14 and 16 when joined are substantially continuous except for a shallow juncture line 32 which is of the same color and texture as the members themselves. The juncture line will not dig into the palm because it is so shallow and may even lend additional attractiveness to the handle. The resultant handle thus has, in effect, a relatively rigid outer member 14 whose grip portion is engageable by the palm of the hand and a resiliently compressible softer inner member 16 which extends along the length of the grip 10 as at 34 and along the arms 12 for a predetermined length from its inner corners 20 and 22 as at 36 to thus provide cushioning not only of the fingers against the underside of the grip 10 in the direction of the grip but also against the inner sides of the arms 12.

The first relatively rigid member 14 can be molded or formed with a protruding rib only for the length of its grip portion as suggested by the line 38 in FIG. 3 plus the inwardly inclined diagonal portions terminating at the inner corners 20 and 22 as suggested by lines 40 in FIG. 3. The resiliently compressible softer second member 16 will, in this case, be made complementary to the relatively rigid first member 14 and the inner surface of the second member 16 will be recessed accordingly to receive and mate with the rib protruding from the inner surface of the first member 14 and be bonded thereto. In this construction, the fingers beneath the grip will be cushioned only in the direction of the grip, not against the sides of the arms 12.

To obtain a resilient cushioning effect which is less stiff than that of the solid cushioning member previously described, the second member 16 can be molded or formed, as shown in FIG. 4, with ribs 42 extending radially inwardly of the inner surface 44 of the second member 16, the radial ribs 42 terminating to form the recess 24 corresponding to the rib 18 of the first member. Thus when the members 14 and 16 are interfitted and secured together, the radial ribs 42 of the member 16 will be bonded to the central rib 18 of the members 14, as will the mating ledges 26 and 28, to thus create closed air pockets 46 between the ribs. While FIG. 4 is shown as a section taken on FIG. 3, it will be understood that the type of air pocket cushioning member 16 shown therein is applicable to both types of construction shown in FIGS. 1 and 3.

While preferred embodiments of the invention have been here shown and described, it will be understood that skilled artisans may make minor variations without departing from the spirit of the invention and the scope of the appended claims.

I claim:

1. A finger-cushioning handle for luggage, carrying cases and the like formed entirely of plastic and comprised of two members, the first member formed of a relatively rigid plastic and including an elongated grip portion with arms depending from the ends thereof, and the second member formed of a resiliently compressible plastic and as long at least as the grip portion between the inner surfaces of the arms, and means fixedly securing the second member to the underside of the grip of the first member, said second member also including portions depending from its ends which extend along the arms for a predetermined distance and are fixedly secured to the inner surfaces thereof so that the fingers are also cushioned in a direction towards the arms.

2. The combination of claim 1 wherein the second member is secured to the first so that their outer surfaces are substantially continuous.

3. The combination of claim 1 wherein the securing means includes a rib protruding from the undersurface of the first member along its grip portion, a mating recess in the second member along its length receiving the rib and means bonding the members together when the rib is fully received in the mating recess.

4. The combination of claim 1 wherein the securing means includes a longitudinal rib protruding from the undersurface of the grip portion and a portion of the inner surfaces of the arms of the first member, a mating recess in the second member along its length including the portions depending from its ends, and means bonding the members together when the rib is fully received in the mating recess.

5. The combination of claim 1 wherein the securing means includes a longitudinal rib protruding from the undersurface of the grip portion and a portion of the inner surfaces of the arms of the first member, a mating recess in the second member along its length including the portions depending from its ends, spaced radial ribs in the second member terminating to form the recess, and means bonding the radial ribs of the second member to the rib of the first when the latter is fully received in the recess to thus form air pockets in the second member.

6. A finger-cushioning handle for luggage, carrying cases and the like formed entirely of plastic and comprised of two members, the first member formed of a relatively rigid plastic and including an elongated grip portion with arms depending from the ends thereof, and the second member formed of a resiliently compressible plastic and as long at least as the grip portion between the inner surfaces of the arms, and means fixedly securing the second member to the underside of the grip to the first member, the securing means including a rib protruding from the undersurface of the first member along its grip portion, a mating recess in the second member along its length receiving the rib, spaced radial ribs in the second member terminating to form the recess, and means bonding the radial ribs of the second member to the rib of the first when the latter is fully received in the recess to thus form air pockets in the second member.

7. A finger-cushioning handle for luggage, carrying cases and the like formed entirely of plastic and comprised of two members, the first member formed of a relatively rigid plastic and including an elongated grip portion with arms depending from the ends thereof, and the second member being substantially solid and formed of a resiliently compressible plastic and as long at least as the grip portion between the inner surfaces of the arms, and means fixedly securing the second member to the underside of the grip of the first member, the securing means including a rib protruding from the undersurface of the first member along its grip portion, a mating recess in the second member along its length receiving the rib and heat sealing means bonding the members together when the rib is fully received in the mating recess.

References Cited

UNITED STATES PATENTS 2,913,080  11/1959  Louik et al. _____ 190—57

DONALD F. NORTON, Primary Examiner

U.S. Cl. X.R.

16—126